United States Patent
Groh et al.

(10) Patent No.: US 7,012,258 B2
(45) Date of Patent: Mar. 14, 2006

(54) X-RAY DETECTOR

(75) Inventors: Burkhard Groh, Erlangen (DE);
Volker Heer, Gundelsheim (DE);
Mathias Hoernig, Erlangen (DE);
Bernhard Sandkamp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 334 days.

(21) Appl. No.: 10/655,027

(22) Filed: Sep. 5, 2003

(65) Prior Publication Data

US 2004/0217295 A1 Nov. 4, 2004

(30) Foreign Application Priority Data

Sep. 6, 2002 (DE) ................ 102 41 426

(51) Int. Cl.
*G01T 1/24* (2006.01)
(52) U.S. Cl. ............. 250/368; 250/370.11; 250/370.09
(58) Field of Classification Search ................ 250/368, 250/370.11, 370.09
See application file for complete search history.

(56) References Cited

U.S. PATENT DOCUMENTS

| 4,577,098 | A | * | 3/1986 | Ogawa ........................ 250/216 |
| 4,737,000 | A | * | 4/1988 | Garlick et al. .............. 250/368 |
| 5,909,029 | A | * | 6/1999 | Tonami et al. .............. 250/367 |
| 6,723,995 | B1 | * | 4/2004 | Rougeot ................ 250/370.11 |
| 6,787,778 | B1 | * | 9/2004 | Kobayashi et al. .... 250/370.09 |
| 6,895,078 | B1 | * | 5/2005 | Alving et al. .............. 378/98.7 |
| 2001/0038076 | A1 | | 11/2001 | Kuwabara |
| 2004/0217294 | A1 | * | 11/2004 | Zur ........................ 250/370.09 |

FOREIGN PATENT DOCUMENTS

| DE | 3151436 | 7/1983 |
| DE | 3416716 | 11/1985 |
| EP | 1113290 | 7/2001 |

\* cited by examiner

*Primary Examiner*—Albert Gagliardi
(74) *Attorney, Agent, or Firm*—Harness, Dickey & Pierce P.L.C.

(57) ABSTRACT

An X-ray detector includes an X-ray converter for conversion of X-ray radiation to light, and a photodiode sensor with an arrangement of two or more photodiode elements for detection of the light produced by the X-ray radiation in the X-ray converter. A nonlinearly absorbent filter is located between the X-ray converter and the photodiode sensor.

31 Claims, 1 Drawing Sheet

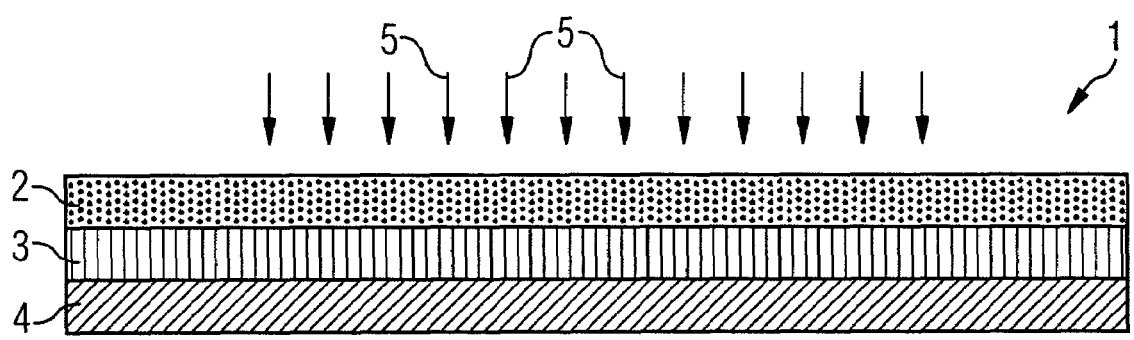

X-RAY DETECTOR

The present application hereby claims priority under 35 U.S.C. §119 on German patent application number DE 10241426.2 filed Sep. 6, 2002, the entire contents of which are hereby incorporated herein by reference.

FIELD OF THE INVENTION

The invention generally relates to an X-ray detector having an X-ray converter for conversion of X-ray radiation to light, and having a photodiode sensor with an arrangement of two or more photodiodes for detection of the light which is produced by the X-ray radiation in the X-ray converter. The invention also generally relates to an X-ray device having an X-ray detector such as this, and to a corresponding method for detection of X-rays.

BACKGROUND OF THE INVENTION

In X-ray detectors of the type mentioned initially, such as those which are described in U.S. Pat. No. 2001/0038076 A1 or EP 1 113 290 A2, X-ray converters are used which are composed of a luminescent material, for example of a scintillator or phosphor layer. Such converters first convert an arriving X-ray quantum to a large number of light quanta. A light sensor which is located immediately behind the X-ray converter measures the amount of light arriving, and this is a measure of the X-ray dose arriving at a specific point on the X-ray detector. In this case, semiconductor structures, for example based of silicon, silicon alloys or germanium, with photodiode elements arranged in a matrix are used as light sensors, and can be read via a suitable line structure.

One problem with this type of X-ray detector is the possible creation of "ghost images" owing to what is referred to as the memory effect. In this case, signals from previously recorded images are transferred to later images. This effect is particularly pronounced when X-rays with a high dose have already been produced.

The "ghost images" are in this case created by metastable states, which are referred to as "traps", being filled within the semiconductor material from which the photodiode elements are formed. These metastable states decay only gradually and produce an additional signal component, the "ghost image", in subsequent detector read cycles. This occurs in particular with the amorphous silicon which is normally used to form such semiconductor structures. The stronger the input signal, that is to say the stronger the intensity of the light for the photodiodes, the greater the number of electrons that are trapped in the metastable states, and the more significant is the occurrence of ghost images in subsequent X-rays. The image areas of an X-ray which have been overexposed during the relevant X-ray was being taken, that is to say for which the photodiodes in the detector have become saturated and thus do not contain any diagnostic information anyway, thus in particular lead to ghost images.

Software algorithms can be used in order to eliminate these ghost image phenomena, or to reduce them as far as possible. In this case, a reference image or correction image is recorded without any irradiation at specific intervals. The reference image is then subtracted from the subsequent images. However, this method has the disadvantage that the noise component in the image is increased. Furthermore, the normal procedure for an X-ray examination must be interrupted in order to record the reference image.

DE 34 16 716 A1 and DE 31 51 436 A1 describe television cameras in which phototropic filters are associated with the camera objective, in order to extend the exposure freedom.

SUMMARY OF THE INVENTION

An object of an embodiment of the present invention is to provide an alternative, which makes it possible to avoid one or more of the disturbance effects resulting from the memory effect in a simple manner and without one or more of the disadvantages mentioned above.

An object may be achieved by an X-ray detector and by a method for detection of X ray radiation.

In this case, according to an embodiment of the invention, a nonlinearly absorbent filter—that is to say a filter which has the characteristic that its transmission can be varied in inverse proportion to the intensity of the incident radiation—is arranged between the X-ray converter and the photodiode sensor and is used first of all to filter the light that is produced in the X-ray converter, before detection in the photodiode sensor.

The introduction of the nonlinear absorber in particular filters out light when a strong light intensity reaches the filter while, in contrast, only a little light, if any at all, is absorbed and/or reflected in the areas in which little light intensity reaches the filter. The light intensity is thus reduced in particular in areas in which over exposure could otherwise occur and in which the relevant image would not provide any information either, such that considerably fewer metastable states are filled, and the memory effect can occur only with a greatly reduced intensity, with care being taken in this case to ensure that diagnostically relevant information is transmitted without any significant attenuation. There is then no longer any need to correct the X-ray images in order to eliminate ghost images with the disadvantages mentioned above.

Any suitable photochromic material which changes its local transmission capability when illuminated with light can be used as a filter. In this case, there are a large number of crystalline chemical compounds that are known to those skilled in the art, in solid or liquid form, and which become colored under the influence of light and, for example, change from a clearly transparent state to an opaque or darkened state, and return to their original state again in darkness.

One example of this is the so-called "phototropic" glasses and plastics which are produced from photochromic material. These materials are normally used for react-to-light sunglasses in the field of optics.

Phototropic glasses are essentially "normal" glasses to which silver halides, for example silver chloride or silver bromide, have been added to the melt in order to sensitize them during the production process, and in which the phototropic characteristic has been activated in a subsequent heat treatment at about 600° C., with a special cooling-down process. The silver halides in the glass then change, when stimulated by light radiation, from a state that is transparent to light to metallic light-absorbent silver, as a result of which the glass becomes darker. In the absence of stimulating radiation, the silver halides return to their transparent initial state, and the glass becomes light again.

These processes take place in a similar way in plastics which are used, for example, to produce plastic spectacle lenses. In this case, organic light-sensitive substances are generally used instead of silver halides and are bonded to the plastic material in a suitable manner. One example of this is the use of indolinone spironaphtoxazines (ISN), whose photoactive part is likewise chemically changed by stimulation by light, in particular long-wave UV radiation.

When choosing photochromic materials for designing the nonlinearly absorbent filter for an embodiment of the present invention, care should preferably be taken to ensure that the material has a particularly good effect in the frequency band of the light produced by the X-ray converter.

Furthermore, a material is preferably used which reacts relatively quickly, that is to say in which the filter becomes more strongly absorbent as quickly as possible when a large amount of light occurs, and which likewise returns quickly to the original state again.

However, a considerable reduction in the disturbances caused by the memory effect can be achieved even by materials which have only a relatively slow effect.

An embodiment of the invention can be used particularly advantageously for those X-ray detectors in which the photodiode sensor is formed on the basis of amorphous silicon or amorphous silicon alloys, since the memory effect in materials such as these is relatively strong.

The X-ray detector according to an embodiment of the invention can in principle be used in any desired X-ray device in which conventional X-ray detectors are also used. There is no need for any additional devices for controlling the X ray detector, or special methods for the evaluation of the images.

BRIEF DESCRIPTION OF THE DRAWINGS

The invention will be described in more detail once again in the following text using an exemplary embodiment and with reference to the attached figure, wherein:

The single FIGURE in this case shows the layer structure of an X-ray detector 1 according to an embodiment of the invention.

DETAILED DESCRIPTION OF THE PREFERRED EMBODIMENTS

The first layer of this X-ray detector 1 is a scintillator layer which forms the X-ray converter 2. This converts the arriving X-ray radiation 5 to light.

The X-ray converter 2 is followed immediately by a filter 3 composed of nonlinearly absorbent material, which has less transmission in the spatial areas in which more light from the X-ray converter 2 reaches the filter 3 than in the areas in which less light from the X-ray converter 2 reaches the filter 3.

The nonlinearly absorbent filter 3 is then directly followed by a photodiode sensor 4, which has a semiconductor structure with photodiode elements which are arranged in a matrix and are read in a conventional manner via a suitable line structure.

In this particularly preferred embodiment, the filter 3 is in this case in the form of fiber optics with a large number of individual glass fiber sections or plastic fiber sections which are arranged alongside one another and run parallel to the light incidence direction. That is to say that they are arranges at right angles to the surface of the photodiode sensor 4 and the X-ray converter 2. Phototropic glass or a phototropic plastic material is used to produce these fiber optics.

If the filter 3 is in the form of fiber optics, this has the advantage that even a relatively thick filter does not degrade the spatial resolution at the location of the photodiode sensor 4 by scattering of the light radiation, coming from the X-ray converter 2, in the filter 3.

Furthermore, this structure ensures that corresponding shading of the phototropic material is achieved only in a very limited area in the spatial areas in which strong light radiation strikes the filter 3, with the desired attenuation thus being achieved only locally in these areas.

The light signal in the normally illuminated, diagnostically relevant areas of the respective X-ray is thus passed through with virtually no attenuation from the X-ray converter 2 through the filter 3 to the photodiode sensor 4, while the signal in the overexposed areas is attenuated considerably. In consequence, the occurrence of ghost images in an X-ray detector 1 such as this is greatly reduced, or is even completely prevented, provided that the filter material is chosen appropriately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An X-ray detector, comprising:
   an X-ray converter, adapted to convert X-ray radiation to light;
   a photodiode sensor, including least two photodiode elements, adapted to detect light produced by the X-ray radiation conversion in the X-ray converter; and
   a nonlinearly absorbent filter, arranged between the X-ray converter and the photodiode sensor.

2. The X-ray detector as claimed in claim 1, wherein the filter is at least partially composed of photochromic material.

3. The X-ray detector as claimed in claim 2, wherein the filter is at least partially composed of at least one of phototropic glass and plastic.

4. The X-ray detector as claimed in claim 3, wherein the filter includes fiber optics composed of at least one of phototropic glass and plastic.

5. The X-ray detector as claimed in claim 1, wherein the filter is at least partially composed of at least one of phototropic glass and plastic.

6. The X-ray detector as claimed in claim 5, wherein the filter includes fiber optics composed of at least one of phototropic glass and plastic.

7. The X-ray detector as claimed in claim 6, wherein the photodiode sensor is at least partially composed of amorphous semiconductor materials.

8. The X-ray detector as claimed in claim 7, wherein the photodiode sensor is at least partially composed of at least one of amorphous silicon and of an amorphous silicon alloy.

9. An X-ray device including an X-ray detector as claimed in claim 1.

10. The X-ray detector as claimed in claim 1, wherein the photodiode sensor is at least partially composed of amorphous semiconductor materials.

11. The X-ray detector as claimed in claim 1, wherein the photodiode sensor is at least partially composed of at least one of amorphous silicon and of an amorphous silicon alloy.

12. A method for detection of X-ray radiation, comprising:
    converting X-ray radiation to light;
    filtering the light through a nonlinearly absorbent filter; and
    detecting the light, produced by the converted X-ray radiation and filtered through the nonlinearly absorbent filter, by a photodiode sensor including photodiode elements.

13. The method as claimed in claim 12, wherein photochromic material is used for filtering.

14. The method as claimed in claim 13, wherein at least one of phototropic glass and plastic is used for filtering.

15. The method as claimed in claim 12, wherein at least one of phototropic glass and plastic is used for filtering.

16. The method as claimed in claim 15, wherein the light is filtered through fiber optics composed of at least one of phototropic glass and plastic.

17. The method as claimed in claim 12, wherein the light is filtered through fiber optics composed of at least one of phototropic glass and plastic.

18. An apparatus for detection of X-ray radiation, comprising:
   means for converting X-ray radiation to light;
   means for filtering the light through a nonlinearly absorbent filter; and
   means, including photodiode elements, for detecting the light filtered through the nonlinearly absorbent filter.

19. The apparatus as claimed in claim 18, wherein the means for filtering is at least partially composed of photochromic material.

20. The apparatus as claimed in claim 18, wherein the means for filtering is at least partially composed of at least one of phototropic glass and plastic.

21. The apparatus as claimed in claim 18, wherein the means for filtering includes fiber optics composed of at least one of phototropic glass and plastic.

22. The apparatus as claimed in claim 18, wherein the sensing means is at least partially composed of amorphous semiconductor materials.

23. The apparatus as claimed in claim 18, wherein the sensing means is at least partially composed of at least one of amorphous silicon and of an amorphous silicon alloy.

24. An X-ray device including an apparatus as claimed in claim 18.

25. An X-ray detector, comprising:
   X-ray converter means for converting X-ray radiation to light;
   sensing means, including least two photodiode elements, for detecting light produced by the X-ray radiation conversion in the X-ray converter; and
   means for filtering the light, including a nonlinearly absorbent filter arranged between the X-ray converter means and the sensing.

26. The X-ray detector as claimed in claim 25, wherein the means for filtering is at least partially composed of photochromic material.

27. The X-ray detector as claimed in claim 25, wherein the means for filtering is at least partially composed of at least one of phototropic glass and plastic.

28. The X-ray detector as claimed in claim 25, wherein the means for filtering includes fiber optics composed of at least one of phototropic glass and plastic.

29. The X-ray detector as claimed in claim 25, wherein the sensing means is at least partially composed of amorphous semiconductor materials.

30. The X-ray detector as claimed in claim 25, wherein the sensing means is at least partially composed of at least one of amorphous silicon and of an amorphous silicon alloy.

31. An X-ray device including an X-ray detector as claimed in claim 25.

* * * * *